D. H. FITCH.
Galvanic-Battery.

No. 219,631. Patented Sept. 16, 1879.

Witnesses:
Inventor:
Derick H. Fitch

UNITED STATES PATENT OFFICE.

DERICK H. FITCH, OF TUSCOLA, ILLINOIS.

IMPROVEMENT IN GALVANIC BATTERIES.

Specification forming part of Letters Patent No. 219,631, dated September 16, 1879; application filed September 9, 1878.

*To all whom it may concern:*

Be it known that I, DERICK H. FITCH, of Tuscola, in the county of Douglas and State of Illinois, have invented certain new and useful Improvements in Galvanic Batteries; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to an improvement in that class of chemical electrical batteries coming under the general designation of galvanic or voltaic batteries, and specifically known as the "chlorine battery."

The main object is to produce a battery of this class combining cheapness of sustenance and a very low internal resistance in proportion to its electro-motive force; and it also has as subsidiary objects cleanliness and ease of management.

It consists in providing a battery having the ordinary zinc positive plate with a negative element composed of carbon and metallic mercury, and a conducting-fluid composed of solutions of the chlorides of sodium or potassium and zinc, and an exciting-fluid composed of solutions of mercuric chloride or mercurous chloride and ammonium chloride, substantially as and for the purpose herein set forth.

Figure 1:
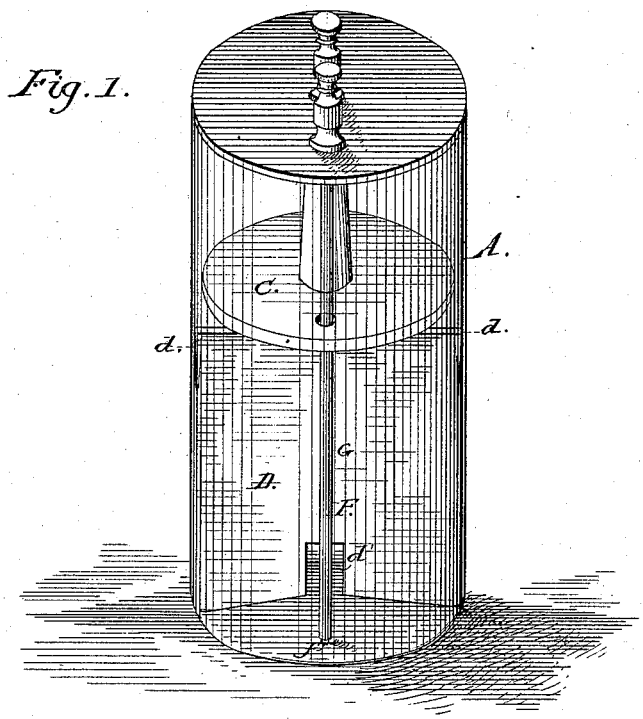
Figure 2:
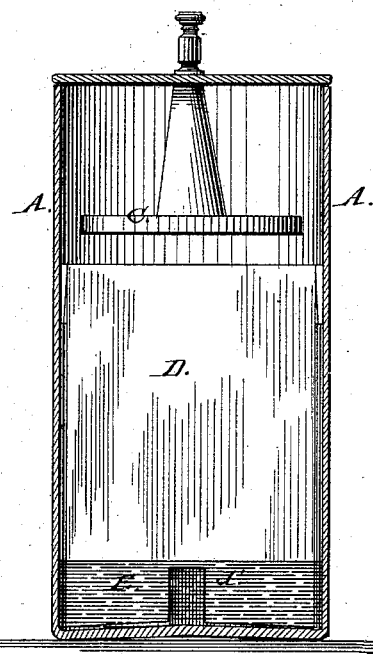

In the accompanying drawings, Figure 1 is a perspective view of a battery cup or cell, showing a suitable form for the embodiment of my invention. Fig. 2 is a vertical central section of the same.

The letter A indicates the cup or cell, which may be made of glass or any suitable material which will resist the action of the solution to be used therein, and C is a zinc positive plate suspended in and near the top of the cup by any well-known means. Below the zinc plate C stand one or more carbon plates, D, resting upon the bottom of the cup or cell A, and supported by a wedge, $d$, inserted between the edge of the plate and the wall of the cup, or by any suitable means. About midway the lower edge of the carbon plate or plates is cut a notch, $d'$, for a purpose which will be hereinafter explained. Upon the bottom of the cup or cell A is a layer of metallic mercury, E, which is in contact with the lower portion of the carbon plates D, and into which the said carbon plates are immersed, the notch $d'$ allowing the solution of the electrolytes to distribute itself evenly on the negative plate. Into the mercury E is also immersed the lower end of a conductor, F, which extends upward through the zinc C. This conductor F is inclosed by a gutta-percha tube, G, which will resist the action of the battery-solution; but a small portion of the conductor F projects below its inclosing-tube, as shown at $f$, in order to make a good electrical connection with the mercury, and, through the mercury, with the carbon plate or plates D.

The solid components of the battery being thus arranged, the space between the plates is filled with a mixed solution of the chlorides of sodium or potassium and zinc, made by first filling the cup or cell with solution of chloride of sodium or potassium nearly saturated. The chloride of zinc is gradually added by the action of the battery. For the exciting compounds or electrolytes, mercuric chloride = $HgCl_2$, (corrosive sublimate,) or mercurous chloride = $HgCl$, (calomel,) and ammonium chloride = $AmCl$, (sal-ammoniac,) which may be dropped into the cup or cell in the same way that sulphate of copper is added to the sulphate-of-copper battery. The electro-motive force of this battery is about the same as the sulphate-of-copper battery. Its internal resistance is very much less. The potential of this battery is due to the difference in chemical attraction of chlorine for zinc and mercury.

The chemical action is as follows: When the battery is in action, mercuric chloride is decomposed, the chlorine unites with the zinc, and the mercury is deposited on the mercury and carbon plates. That upon the latter is in minute globules, which, being in contact with mercuric chloride, decomposes it and unites with a part of its chlorine, forming mercurous chloride, HgCl, (calomel,) as shown by the formula $Hg + HgCl_2 = 2HgCl$. The mercurous chloride, being in contact with the ammonium chloride, will, in turn, decompose that and unite with its chlorine, again forming mercuric chloride, as shown by the formula $2HgCl + 2AmCl = 2HgCl_2 + 2NH_3 + 2H$, thus to a considerable extent forming the electrolytes within the battery, and making the ammonium chloride indirectly serve as an electrolyte. This action also takes place to some extent upon the surface of the mercury. The chemical action by which mercuric chloride is re-formed within the battery could take place with either of these substances in a solution of the chloride of ammonium, and in connection with the negative plate, without the presence of the chlorides of sodium or potassium. The chlorides of sodium or potassium aid this action. Besides, they are probably the best of neutral liquid-conductors, and therefore diminish the internal resistance of the battery, and they are the best solvents for the electrolyte. This battery can be operated at much less expense than the class of batteries known as "sulphate-of-copper batteries." The relative amount of current which the materials will yield may be shown by a chemical comparison.

In the sulphate-of-copper battery, one part of sulphate of copper consists of—

| | | | |
|---|---|---|---|
| 1 Copper | 63.4 parts | } =1 oxide of copper=79.4 parts. | |
| 1 Oxygen | 16.0 " | | |
| 1 Sulphur | 32.0 " | } =1 sulphuric acid=80.0 " | |
| 3 Oxygen | 48.0 " | | |
| 10 Hydrogen | 10.0 parts | } =5 water of crystallization=90.0 " | |
| 5 Oxygen | 80.0 " | | |
| 1 Sulphate of copper | | | 249.4 " |

This is equal to—

| | |
|---|---|
| Copper | 25.42 per cent. |
| Oxygen | 06.42 " " |
| Sulphuric acid | 32.08 " " |
| Water of crystallization | 36.08 " " |
| | 100.00 |

In my present invention one part of mercuric chloride consists of—

| | | |
|---|---|---|
| 1 Mercury | 200 parts | } =1 mercuric chloride=271 parts. |
| 2 Chlorine | 71 " | |

This is equal to—

| | |
|---|---|
| Mercury | 73.80 per cent. |
| Chlorine | 26.20 " " |
| | 100.00 |

One part of ammonium chloride consists of—

| | |
|---|---|
| 1 Nitrogen | 14.0 parts. |
| 3 Hydrogen | 3.0 " |
| 1 Ammonia | 17.0 parts. |
| 1 Hydrogen | 1.0 " |
| 1 Ammonium | 18.0 " |
| 1 Chlorine | 35.5 " |
| 1 Ammonium chloride | = 53.5 |

This is equal to—

| | |
|---|---|
| Ammonia | 31.78 per cent. |
| Hydrogen | 01.87 " " |
| Chlorine | 66.35 " " |
| | 100.00 |

The relative amounts, by weight, of oxygen and chlorine required to unite with a metal to produce a given force are in the ratio of 16 to 35.5. The available oxygen in sulphate of copper is 06.42 per cent.; that of chlorine in mercuric chloride is 26.20 per cent., and of chlorine in ammonium chloride is 66.35 per cent.

Now, 16 : 35.5 :: 6.42 : 14.84, and with mercuric chloride 14.84 : 1 :: 26.20 : 1.84, and with ammonium chloride 14.84 : 1 :: 66.35 : 4.66.

In round numbers, a given weight of mercuric chloride will yield $1\frac{17}{20}$, and ammonium chloride (by this combination) $4\frac{2}{3}$ times as much current as an equal weight of pure sulphate of copper. While the first cost of mercuric chloride is much more than sulphate of copper, the residue is valuable. For each pound of it used, nearly three-fourths of a pound (.738 pound) of pure mercury is deposited, a considerable portion of which is immediately reconverted into the bichloride within the battery by the chemical action described, and the balance can be cheaply reconverted into the bichloride by well-known chemical process. Two pounds of sulphuric acid and one and one-fifth pound of common salt, with the necessary apparatus and fuel, are all the materials required to convert one pound of mercury into the bichloride weighing 1.355 pound; and this quantity will yield nearly as much current as two and one-half pounds of pure sulphate of copper. Referring to above comparison, 1 : 1.84 :: 1.355 : 2.493.

Owing to its very low internal resistance, the economy of using this battery on ordinary local circuits or others of low resistance is very great. The chloride of zinc resulting from the action of this battery is more valuable than the sulphate of zinc from the sulphate-of-copper battery. Zinc is passive in a mixed solution of the chlorides of sodium and zinc. There is no direct decomposition of water, as is the case with zinc in a solution of sulphate of zinc, and there is no action upon it when the circuit is open. There is no accumulation of oxides or other matter upon its surface, except the impurities which the zinc contains. It is free from wasting local action. The great gravity of the mercury solution nearly prevents it from rising in the other solution, and the small quantity that does get diffused is consumed on coming in contact with the carbon plate.

By a proper use of the electrolytes this battery can be equally well adapted to open or closed circuits of high or low resistance. When used on an open circuit or one of high resistance, only a small quantity of the electrolytes should be used; or the mercurous chloride $HgCl$ (calomel) may be used instead of the mercuric, it being much less soluble. It is emphatically a clean battery. As the amount of chloride of sodium or potassium in solution is not changed by the action of the battery, and the chloride of zinc formed by its action is a deliquescent salt, there is no crystallization upon the edge of the containing-vessel or connections. The solution gets very clear and remains so, and, as stated above, the zinc remains clean. It will stand intense cold without freezing. It is free from fume or odor, except a very faint odor of ammonia from the decomposed ammonium chloride. Owing to its cleanliness and the extreme solubility of the product of its action, this battery requires but little care. Chloride of zinc does not have to be removed from the battery as sulphate of zinc does. Owing to the cheapness with which the electrolytes can be produced and the extraordinary amount of current which they yield, to its freedom from wasting local action, its low internal resistance, its cleanliness, and the little care it requires, this battery can be operated at very small cost.

Having thus described my invention, I claim as new and useful—

1. A negative plate composed of a combination of the metallic mercury E and carbon plate or plates D, as described, and for the purpose specified.

2. A negative plate composed of the mercury E and carbon plate or plates D, in combination with solutions of the chlorides of sodium or potassium and zinc, and with mercuric chloride or mercurous chloride and ammonium chloride, for the purpose of depositing mercury in suitable condition to be taken up, and of taking it up and reconverting it into mercuric chloride by the chemical action, as specified.

3. In a chemical electric battery, a negative plate composed of the metallic mercury E and carbon plate or plates D, the latter standing vertically in the cell and reaching up nearly to the positive plate, for the purpose of diminishing the internal resistance of the battery, and of consuming that portion of the electrolyte which gets diffused in the other solution, substantially as specified.

4. A negative plate composed of the mercury E and carbon plate or plates D, in combination with the conductor F, for the purpose of making an electrical connection with the carbon plate or plates D beneath the surface and within the solution of the battery, substantially as specified.

5. Mercuric chloride (corrosive sublimate) or mercurous chloride (calomel) with ammonium chloride (sal-ammoniac) as excitants or electrolytes, substantially as specified.

In testimony that I claim the foregoing as my own invention I affix my signature in presence of two witnesses.

DERICK H. FITCH.

Witnesses:
ASA MILLER,
HENRY B. MADISON.